Patented May 27, 1924.

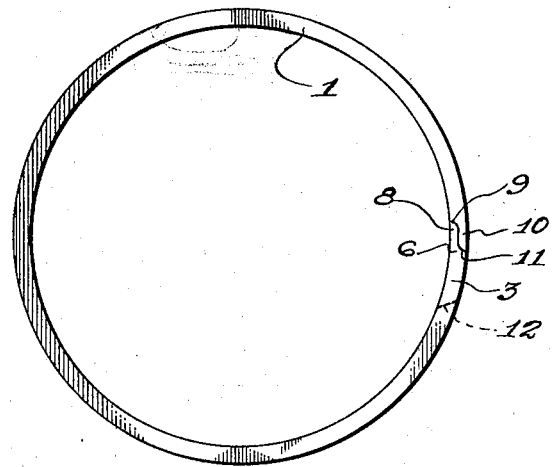
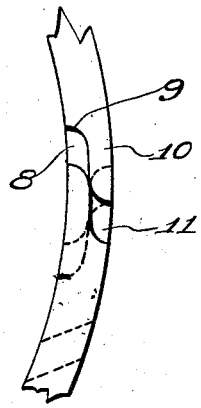
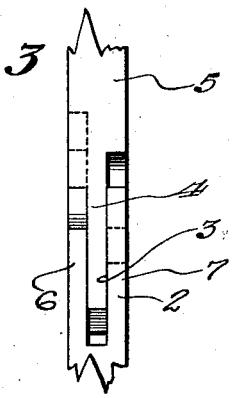
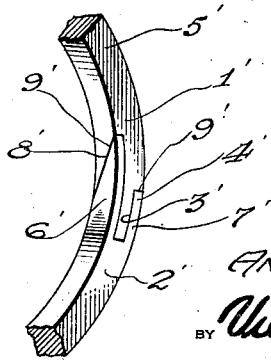

1,495,909

UNITED STATES PATENT OFFICE.

ANTON M. KROCZEK, OF CHICAGO, ILLINOIS.

PISTON RING.

Application filed August 26, 1922. Serial No. 584,443.

*To all whom it may concern:*

Be it known that I, ANTON M. KROCZEK, a citizen of the United States, residing at Chicago, in the county of Cook and State of Illinois, have invented new and useful Improvements in Piston Rings, of which the following is a specification.

This invention relates to piston rings for use on pistons on internal combustion engines, and an object of the invention is to provide a leak-proof non-rupturing piston ring constructed of phosphorus bronze or analogous material which may be used in connection with the pistons of internal combustion engines, of approved types, without requiring alterations to the pistons, and one which will not mark or score the cylinders with which it is used.

Another object of this invention is to provide a piston ring as specified, the free ends of which have interlocking connection to prevent relative transverse and radial movement of the meeting ends of the ring.

Other objects of the invention will appear in the following detailed description taken in connection with the accompanying drawing wherein:

Fig. is a plan of the improved piston ring.

Fig. 2 is an enlarged fragmentary plan of the piston ring.

Fig. 3 is an edge elevation of the meeting ends of the ring.

Fig. 4 is a detail perspective view of the modified form of the ring.

Referring more particularly to the drawings, the meeting ends of the improved piston ring are provided for interlocking engagement one with the other to prevent both lateral and radial relative movement of the ends but to permit circumferential movement of the ends for permitting proper expansion of the piston ring during use. The end 2 of the ring 1 is provided with a central circumferential extending groove 3 projecting inwardly a short distance from the terminal of the end and this groove is adapted to receive the tongue 4 formed upon the end 5. The arms 6 and 7 which are positioned one upon each side of the groove 3 are provided respectively with underhung and overhanging reduced portions 8, the ends of which are rounded as shown at 9. The reduced portions 8 interlock with oppositely disposed reduced portions 10 formed on each side of the tongue 4 and the ends of the reduced portions 10 are rounded as shown at 11. The outer end of the tongue 4 and the inner end of the groove 3 are preferably beveled as shown at 12, and this together with the interlocking engagement of the reduced extensions 8 and 10 prevents leakage past the piston ring and also prevents relative movement of the ends of the piston ring except in a longitudinal manner. The rounded surfaces on the extensions 8 and 10 permit free and unimpeded engagement of these sections upon the closing of the ring, preventing sticking of the ring which might be caused by endwise engagement of the extensions. Attention is directed to the fact that the reduced extensions 8 and 10 are disposed out of transverse alignment as shown in Fig. 3 for permitting a greater amount of spreading action of the ring 1, but at the same time retaining the ends of the ring against lateral movement, this arrangement providing for a greater spreading action than is usually the case with the piston rings in use at the present time.

In Fig. 4 of the drawings, a modified form of the invention is shown in which the end 2' is provided with a groove 3' which receives thereon the tongue 4' formed upon the end 5'. The extensions or arms 6' and 7' have their ends beveled as shown at 8' for engagement with beveled surfaces 9' formed on the end 5' of the ring 1', the beveled ends or surfaces 8' or 9' acting in the same manner as the rounded ends of the extensions 8 and 10.

It is, of course, to be understood that the invention may be constructed in other manners and the parts associated in different relations and, therefore, I do not desire to be limited in any manner except as set forth in the claims hereunto appended.

Having thus described my invention what I claim is:

1. In a piston ring, meeting ends, one of said ends provided with a longitudinally extending central groove, a tongue on the other of said meeting ends for insertion in said groove, inter-engaging extensions formed on said ends for inter-engagement when the ring is closed, and the inter-engaging extensions on one side of the ring being disposed out of transverse alignment with the extensions on the opposite side as and for the purpose specified.

2. A piston ring, comprising meeting ends, one of said meeting ends provided with a longitudinally extending central groove, a tongue upon the other meeting end for insertion into said groove, arms formed by said groove, being provided one with an overhanging extension and the other with an underhung extension of substantially one-half the thickness of the ring, corresponding extensions formed upon the tongue carrying end and adapted to inter-engage with the extensions upon said arm for providing a substantially leak-proof piston ring, and the extensions upon one side of the tongue and groove being disposed out of transverse alignment with the extensions on the other side.

In testimony whereof I affix my signature.

ANTON M. KROCZEK.